Figure 1:
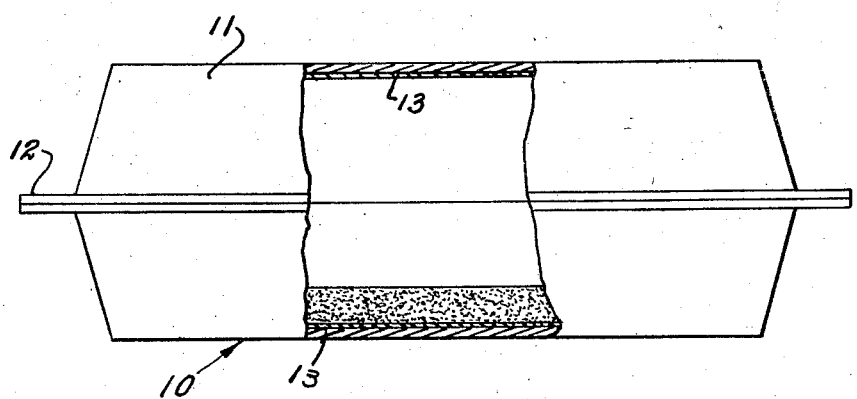

May 29, 1945.   W. D. FORD   2,377,076

PARTING AGENT IN CELLULAR GLASS MANUFACTURE

Filed March 4, 1943

Inventor

WALTER D. FORD

By Olen E. Bee
Attorney

Patented May 29, 1945

2,377,076

UNITED STATES PATENT OFFICE 2,377,076

PARTING AGENT IN CELLULAR GLASS MANUFACTURE

Walter D. Ford, Port Allegany, Pa., assignor to Pittsburgh Corning Corporation, Allegheny County, Pa., a corporation of Pennsylvania Application March 4, 1943, Serial No. 477,974

2 Claims. (Cl. 49—65)

The present invention relates to the operations of forming a cellular or foam-like glass in refractory molds, and it has particular relation to the formation of such glass by heating to the sintering temperature in a mold, a mixture comprising finely ground glass and a small percentage of a gassing agent, such as carbon black or calcium carbonate.

One object of the invention is to provide a process of forming cellular glass whereby separation of the cellular product from the molds can be effected without damage to the molds or product.

These and other objects will be apparent from consideration of the following specification and the appended claims.

It has heretofore been proposed to provide a cellular or foam-like glass containing a great many small air cells, which could be used as an insulative material in buildings, refrigerators and other structures requiring walls having a low degree of heat conductivity. Probably the most satisfactory method of forming cellular glass comprises finely grinding the glass to a powder, admixing it with a gassing agent, such as 1 or 2% of calcium carbonate or a suitable percentage of carbon, designed to decompose or to react at a temperature somewhat above the sintering point of the glass. When such mixture is heated to a temperature sufficient to cohere the glass particles the gassing agent is decomposed and/or reacts with the glass liberating large volumes of gas in the coherent mass. These gases are entrapped to form minute bubbles, thus causing the mass to become bloated or cellulated to a volume perhaps of 6 or 7 times and upward of the original volume of the powdered material.

The heating operation is customarily performed in a mold of suitable configuration, which mold must be composed of a material of considerable resistance to heat and to the action of highly heated glass. One of the best and most economical molds heretofore employed comprises two shallow pan-like sections shaped somewhat like a conventional bread or cake pan, but being composed of sheet metal, such as chrome-nickel alloy steel having considerable resistance to corrosion and softening at high temperatures. The intimate mixture of finely ground glass and gassing agent is placed in one of these sections, and a second is then inverted thereover to provide a cover. If the quantity of pulverulent material is properly adjusted to the size of the pans the latter will be just approximately filled when the material has become sintered and completely bloated.

In order that the freshly formed, cellular body will separate readily from the molds, the interior surfaces of the latter must be coated with parting material, which will prevent adhesion of the cellular mass to the metal. These parting agents usually are pulverulent in nature and are applied as thin slurries that can be sprayed, sluiced or otherwise spread upon the the surface and dried. A parting agent, to perform satisfactorily, must be a fairly good refractory, must have but little fluxing action with the glass, must not react with the metal of the molds or the protective oxides of the metal. The coatings must adhere to the metal over a broad range of temperature, extending approximately from 70° F. to 1600° F.

Relatively few pulverulent compositions possess all the requisite properties in a satisfactory degree. The present invention involves the discovery that aluminum oxides, especially when they contain combined water, are eminently suitable for use as parting materials for coating molds employed in forming cellular glass by sintering powdered glass containing a gassing agent. These hydrated aluminum compounds give off their water of hydration slowly over the range at which the cellular bodies are formed and this action is highly beneficial to the efficiency of the coating. These materials are usually inherently finely divided. They should be mixed with water and an organic binder, such as dextrin, that can be burned out to leave a powder that can be reused. A suspending agent, such as gum tragacanth may also be added in an amount for example of 1%, based on the water solution employed as a suspending medium.

Figure 2:
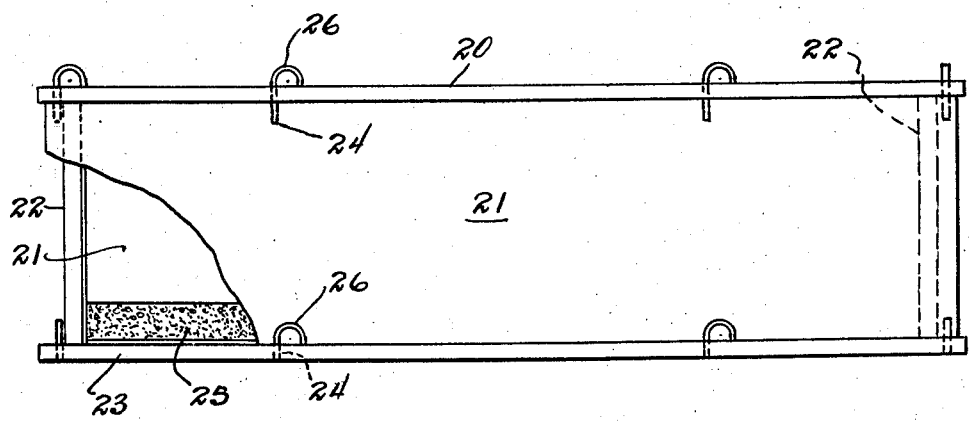

Figures 1 and 2 are elevational views with certain parts broken away, showing two convenient types of molds for use in the practice of the invention.

Each mold, as previously stated, comprises upper and lower sections 10 and 11, which preferably are pan-like and frustapyramidal in profile, the taper being toward the mouth of each pan or section. The sections are provided with marginal flanges 12, designed to register with each other. In accordance with the present invention the pans or sections are lined or coated with thin layers 13 of a material containing aluminum oxide having a substantial amount of water of hydration. Hydrated alumina [Al(OH)$_3$], diaspor and bauxite constitute examples of materials contemplated by the invention. These all contain water of hydration, which is given off slowly over a considerable range of tempertaure within which the pulverized glass is sintered and the gassing agent is decomposed or reacted to cellulate or bloat the sintered mass. This liberation of water during the sintering and bloating operation seems to be highly important to the successful operation of the invention.

In some cases compound oxides of aluminum and silicon, e. g., Florida kaolin, may be employed. These also contain water of hydration that evolve over the desired temperature range.

A suitable composition may be obtained by admixture of aluminum hydroxide or bauxite or a clay containing bauxite and a bonding agent, e. g. dextrin, and mixing with water to render the mass sufficiently fluid for application by spraying, sluicing or similar modes. The material may be applied to the molds while they are heated to a temperature of for example 200 to 400° F., which results in immediate drying of the coatings.

Coated molds are charged in any convenient manner or with any suitable apparatus with a mixture of finely ground glass similar to window glass, e. g., a glass ground to pass a screen of 200 mesh, along with a gassing agent, such as 1 or 2% of calcium carbonate in finely-divided form or a suitable amount of carbon. Preferably the molds are so filled as to allow an expansion of some 600 or 700%. The top section is laid upon the bottom section and the molds are then heated in a suitable oven to a temperature above the sintering point and below the point of complete melting of the glass. This range of course will vary somewhat with different glasses, but in most cases will be approximately within the range of 1500 to 1600° F. Heating in the furnace is continued until the glass is sintered and bloated, after which the molds are removed from the furnace, for example, until the molds have cooled to about 1100° F. to harden the cellular body. They are then returned to a furnace at a temperature of 1300° F. and heated for a period of ½ to 2 minutes, to effect what is termed a shock heating. This results in differential expansion of the mold with respect to the cellulated mass therein. The cellular mass is not substantially reheated. After the shock heat treatment the molds may be removed from the furnace and the cellular bodies emptied out. The cellular mass can be conducted through an annealing lehr where it is brought slowly to a temperature below the annealing point while the molds may be returned for refilling.

Mold coatings comprising hydrated aluminum oxide in the form of bauxite or other suitable form containing water of hydration have no substantial effect upon the molds to which they are applied. They also do not attack the glass and they separate readily from the glass at the conclusion of the heating operation. In many cases the coating material flaking off from the molds can be remixed with water and binder and used over, thus reducing the quantity of material required to maintain the coatings of the molds over a cycle of operation.

A second form of mold that may be employed in the process is disclosed in Fig. 2. It is of knockdown or collapsible construction, includes top plate 20, side plates 21, end plates 22 and a bottom plate 23. The top and bottom plates are provided with vertically disposed pins 24 that hold the side and end walls in position during operations. When the cellular body is to be removed the mold is merely taken apart. This mold may be formed of refractory steel or of ceramic refractory material as may be desired. Certain parts, e. g., the top and bottom may be of ceramic material and the sides and ends may be of refractory steel. These molds are coated, provided with charge 25, and heated in substantially the same manner as the mold shown in Fig. 1. Hooked portions 26 upon the pins 23 facilitate handling operations. The molds shown in Fig. 2 do not require shock heating to permit removal of the cellular block.

The forms of the invention herein shown and described are to be considered merely as illustrative. It will be apparent to those skilled in the art that numerous modifications may be made therein without departure from the spirit of the invention or the scope of the appended claims.

I claim:

1. In a process of forming cellular glass by heating a mixture of pulverulent glass and a thermally decomposable gassing agent, to a temperature of about 1500 to 1600° F. in a heat resistant mold, the step of preliminarily coating the mold with a film of chemically hydrated bauxite as a parting agent between the mold surface and the cellular product.

2. In a process of forming cellular glass by heating a mixture of pulverulent glass and a thermally decomposable gassing agent to a temperature of about 1500 to 1600° F. in a mold of heat and corrosion resistant steel, the step of preliminarily coating the mold with a film of chemically hydrated bauxite as a parting agent between the mold surface and the cellular product, said oxide decomposing at the temperature of operation to form water vapor.

WALTER D. FORD.